(12) United States Patent  
Moriarty

(10) Patent No.: US 6,308,466 B1
(45) Date of Patent: Oct. 30, 2001

(54) TORNADO PROTECTIVE ENCLOSURE

(76) Inventor: Robert J. Moriarty, 23 Fenton Rd., Monson, MA (US) 01057

( * ) Notice: Subject to any disclaimer, the term of this patent is extended or adjusted under 35 U.S.C. 154(b) by 0 days.

(21) Appl. No.: 09/337,360

(22) Filed: Jun. 21, 1999

Related U.S. Application Data

(60) Provisional application No. 60/090,120, filed on Jun. 22, 1998.

(51) Int. Cl.$^7$ ........................................ E04H 1/00
(52) U.S. Cl. ................. 52/79.5; 52/127.1; 52/79.1; 52/169.6; 52/284; 52/285.2; 52/285.3; 52/285.4; 52/582.2
(58) Field of Search .................. 52/79.1, 169.6, 52/79.5, 284, 285.2, 285.3, 285.4, 582.2

(56) References Cited

U.S. PATENT DOCUMENTS

| | | | | |
|---|---|---|---|---|
| 2,751,635 | * | 6/1956 | Donnohua | 52/79.5 |
| 2,827,004 | * | 3/1958 | Luce | 109/1 S |
| 3,294,346 | * | 12/1966 | Summers | 244/121 |
| 4,436,353 | * | 3/1984 | Tucker | 312/241 |
| 4,631,038 | * | 12/1986 | Ritter | 441/80 |
| 5,072,984 | * | 12/1991 | Jackson | 296/56 |
| 5,210,984 | * | 5/1993 | Eckel | 52/79.5 |
| 5,398,465 | * | 3/1995 | Tagg | 52/79.1 |
| 5,533,305 | * | 7/1996 | Bielecki | 52/79.1 |
| 5,588,258 | * | 12/1996 | Wright | 49/340 |

* cited by examiner

*Primary Examiner*—Carl D. Friedman
*Assistant Examiner*—Pat J. Chavez

(57) ABSTRACT

The invention provides a temporary portable shelter for an individual or individuals from the severe effects of a tornado or hurricane. The Enclosure consists of an case, having six sides, which is constructed of polycarbonate thermoplastic of extremely high quality and of superior strength and endurance. The Enclosure has a hinged door with door latch assemblies that may be operated from the inside. It has ventilation padding to protect the individual from injury while within the Enclosure. It may be bolted to the floor. Light may enter the Enclosure and a person inside may see out of the Enclosure. The Enclosure may also be outfitted with reflective tape detailing or a battery operated strobe light to help emergency staff quickly locate victims of severe weather conditions.

9 Claims, 8 Drawing Sheets

TORNADO PROTECTIVE ENCLOSURE

CROSS REFERENCE TO RELATED APPLICATIONS

Provisional Patent Application filed Jun. 22, 1998; Ser. No. 60/090,120.

FIELD OF THE INVENTION

The present invention generally relates to a portable temporary shelter that is a complete enclosure, which protects human beings and animals from flying and falling debris and from severe weather conditions such as tornadoes and hurricanes. More particularly, the invention relates to a shelter that can be used by all individuals, including those who live in mobile homes and recreational vehicles, and those with limited space and real estate.

BACKGROUND OF THE INVENTION

It is clear statistically that most deaths and injuries occurring as a result of catastrophic storms are caused by flying debris. Such storms frequently occur at night when people are sleeping. In addition, many storms often are not identified by radar and approach without much advance warning.

Prior to the present invention, individuals seeking to provide shelter for themselves their families, their pets and their valuable possessions during a severe storm had few and costly alternatives. To date, there are large box-like and spherically shaped shelters that are either installed completely underground in an excavated hole or partially buried in the ground. There are also shelters which are built above or in connection with a bed to protect individuals while they sleep. These prior sheltering devices typically contain many parts and are heavy, large and permanent. In addition, the fabrication and installation of these shelters requires drilling, welding, bolting and excavation, which may be impossible or too costly for individuals with limited real estate or those living in a mobile home or recreational vehicle. Thus, to date, individuals with these types of living arrangements are particularly vulnerable to severe weather.

Consequentially, there is a need for an inexpensive shelter that can be used by all individuals, including those with limited space and real estate and those who live in mobile homes and recreational vehicles most commonly in the southern United States. There is a further need for a shelter that is lightweight and portable, yet a complete enclosure that is strong enough to withstand flying and falling objects and projectiles during a tornado or earthquake. There is a further need for a shelter that requires minimal and easy assembly. There is a further need for a shelter that is versatile and can be used for purposes other than as an emergency shelter.

SUMMARY OF THE INVENTION

The present invention, accordingly, provides a shelter that overcomes the disadvantages and limitations associated with prior shelters. The invention consists of a rectangular or square six sided enclosure with a top having a door or entry/exit means with a continuous hinge along one edge which has ventilation and peep holes spaced around its periphery and around the periphery of each side of the Enclosure. The door has a handle on the exterior. There are door latch assemblies on the inside to secure the door. The panels which make up the Enclosure are removable easily from the inside or in the case of the door panel assembly from the outside with the use of a tool. The strength of the panels is increased by metal stiffeners placed within the panels. The Enclosure may be manufactured of any size sufficient to enclose one individual or many individuals. The maximum feasible size to meet all other required features of the invention is seven feet long by seven feet wide by seven feet high.

The invention is constructed to be a relatively lightweight portable shelter suitable for indoor installation. The invention is multi-purpose because when installed in a living area, the invention might, for example, be used as a table or base for a bed. The invention may also be located within a closet or mounted with anchor bolts vertically and used as a closet in a small living area. Individuals might purchase the invention and locate it in the garage area or inside the home.

The invention consists of a six sided polycarbonate thermoplastic enclosure and will be referred as "Enclosure" herein. To provide added strength, the polycarbonate Enclosure may be supported by a metal frame and or stiffener channels built within the panels of the Enclosure. Polycarbonate is a tough, dimensionally stable, transparent thermoplastic that has many applications which demand high performance properties. This versatile thermoplastic maintains its properties over a wide range of temperatures, from 40° F. to 280° F. Unnotched polycarbonate is virtually unbreakable, making it extremely safe in areas where it may be exposed to impact. When exposed to repeated heavy blows, the material tends to cold form rather than shatter. The polycarbonate thermoplastic is also impenetrable by sharp objects.

The Enclosure is fabricated of polycarbonate and has a metal frame. It is capable of withstanding winds of 250 miles per hour. More than 99 percent of all reported tornadoes have winds of up to 250 miles per hour and such wind speed is the cause of 99 percent of all reported tornado injuries to persons. The Enclosure is capable of withstanding a 2 inch by 4 inch wooden board weighing approximately 15 pounds, traveling at 100 mph, striking on end perpendicular to the enclosure surface (the so-called timber test). The standard test for a hurricane structure is a 9 pound object traveling at 34 miles per hour. The Enclosure passed the timber test at Texas Tech University in Lubbock, Tex.

In the event of a storm, a person would enter the Enclosure, most likely in a reclined position, although one would enter in a standing position if the Enclosure was installed in an upright position. There are means for the person to then securely close and fasten the Enclosure from the inside. There are means within the Enclosure to provide adequate ventilation for one or more people. There are means through which a person may peer outside the Enclosure and through which light may enter the Enclosure. The Enclosure is transparent allowing light to enter the Enclosure through the panels.

A person would stay within the Enclosure until rescued by emergency workers or until the person is able to safely exit the Enclosure independently once the severe weather condition is over. In the event that an emergency worker rescues a person in the Enclosure, there are means to open the fastened Enclosure from outside the Enclosure. The panels are removable from the inside and from the outside to facilitate easy exit.

The inside of the Enclosure may be outfitted with padding as requested by the owner. Padding may be included to prevent injury and provide comfort to the user. The outside of the Enclosure may be detailed with reflective tape and a battery operated strobe light may be located either inside or outside of the Enclosure to assist emergency rescue workers in locating the Enclosure. The Enclosure is constructed in a modular fashion of panels which may be removed from the inside or the outside with the use of one simple tool Removal of panels provides a method of egress from the Enclosure. In the event that the Enclosure is installed in a vertical or upright position, it may be used as a closet or located inside a closet. Individual(s) would enter the Enclosure and close the door behind them. The latch would then be secured from the inside. The latch may be opened from the inside as well to allow for egress. The door or entry/exit means may be outfitted with gas filled lift assists when installed in the horizontal position to help lift the door.

Thus, it is a primary objective of the invention to provide individuals with a portable temporary shelter to protect them from injury due to falling or flying objects as a result of a severe weather condition.

It is a further objective of the present invention to provide an affordable versatile shelter for individuals who own limited real estate and individuals in small living spaces. It is a further objective of the present invention to provide a shelter that may be stored within a small living space and may be used in the small living space by an owner for other purposes such as for a closet, a table or a bed base.

It is a further objective of the present invention to provide a shelter which will be recognizable to emergency response crews so that victims of severe weather conditions might be located without unreasonable delay.

BRIEF DESCRIPTION OF THE DRAWINGS

These and other features, aspects and advantages of the present invention will become better understood with regard to the following description, appended claims and accompanying drawings where:

DETAILED DESCRIPTION OF THE PREFERRED EMBODIMENT

In the various figures, there is disclosed a Tornado Protective Enclosure ("Enclosure") comprised mainly of an Enclosure 19 that is fabricated of high quality polycarbonate thermoplastic which has a good balance of toughness, clarity, high heat deflection, dimensional stability and excellent electrical properties.

Figure 1:
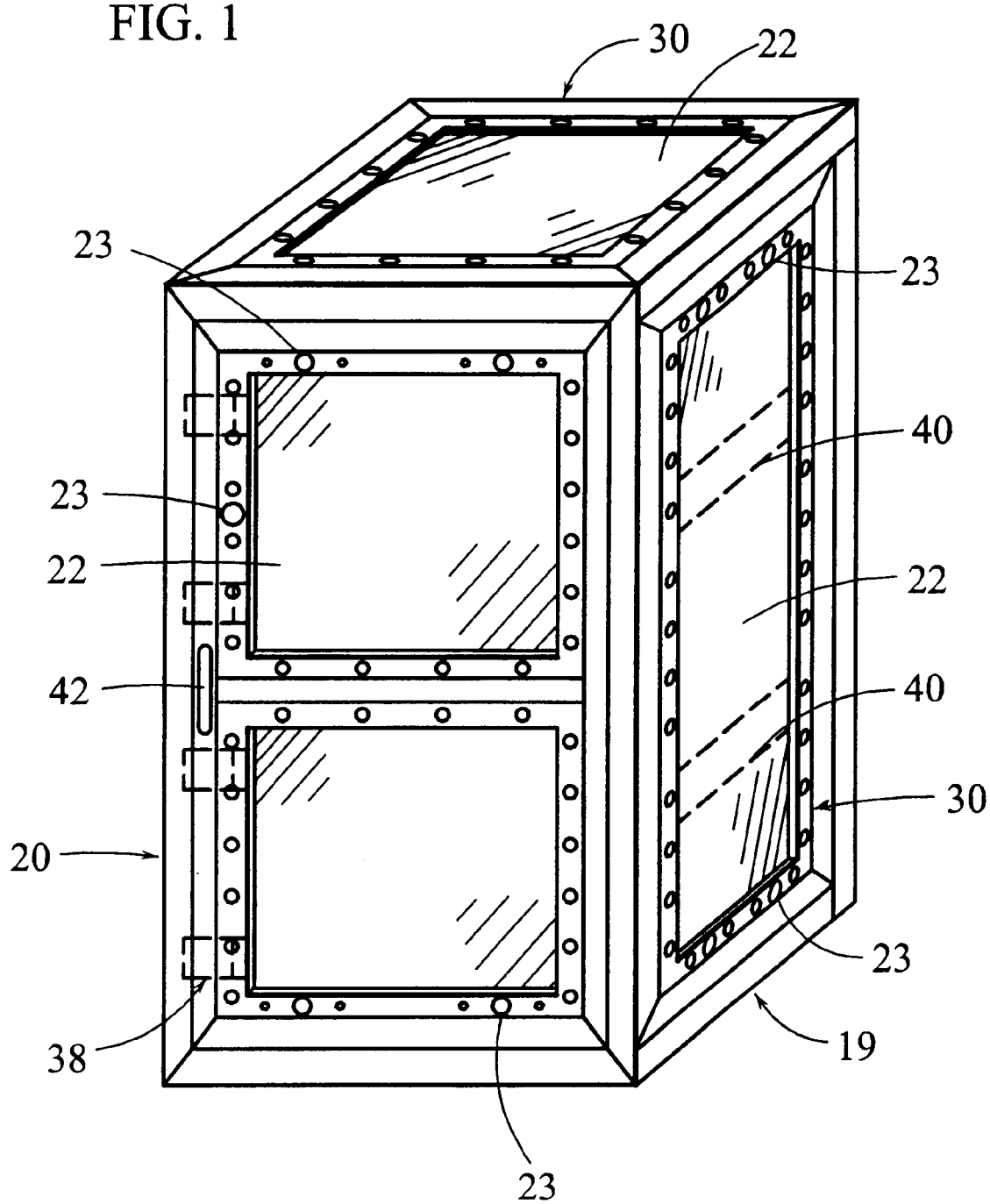
FIG. 1 is a perspective view of the Tornado Protective Enclosure in accordance with the present invention.

Referring to FIG. 1, is the Enclosure 19 is in a closed position. Preferably, the Enclosure 19 has an overall rectangular shape sized to completely enclose at least one person. The person may enter and exit the Enclosure 19 through a typical door panel assembly 20 and may exit through any typical panel assembly 30 located on any side of the Enclosure 19.

Figure 12:
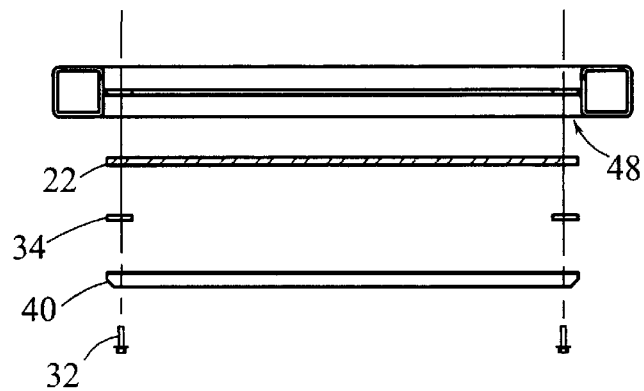
FIG. 12 is a top view of panel assembly.
Figure 13:
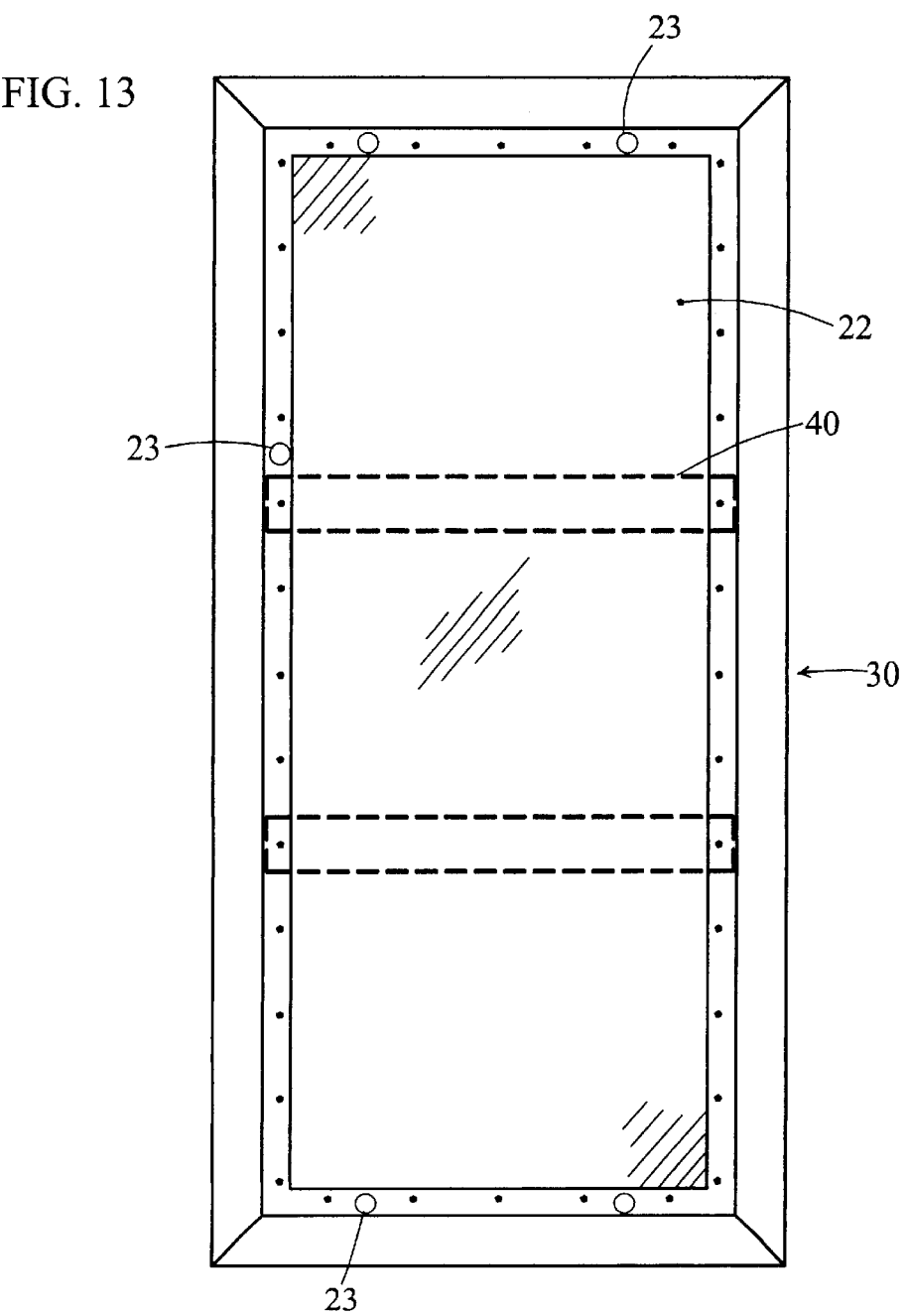
FIG. 13 is a front view of panel assembly.

A typical panel assembly 30 is constructed as shown in FIG. 12 and FIG. 13 and referring to those figures, consist of a frame weldment 48 a polycarbonate panel 22 two clamp bars 34 a stiffener channel 40 and several hex headbolts, plain washers and lock washers 32 also air holes, peepholes 23.

Figure 10:
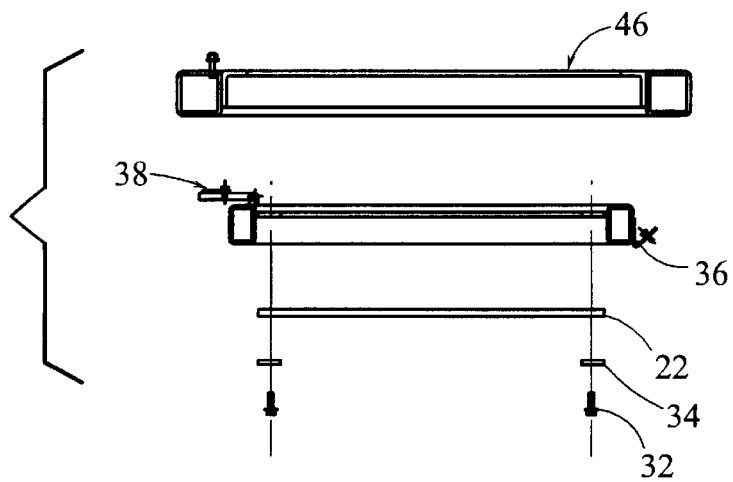
FIG. 10 is a top view of door panel assembly.
Figure 11:
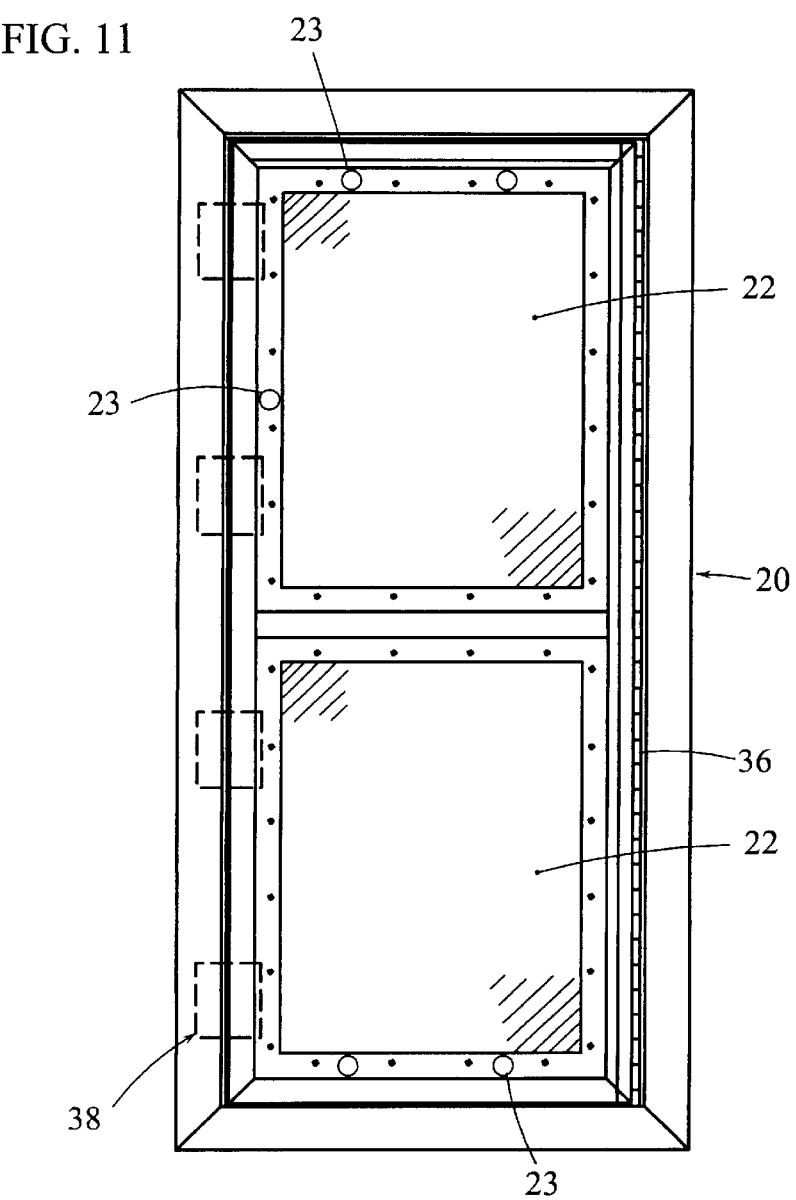
FIG. 11 is a front view of door panel assembly.

Referring back to FIG. 1, the Enclosure 19 having a typical door panel assembly 20 having a handle 42 and comprised of door panel assembly as shown in FIGS. 10 and 11 consisting of a frame weldment 46 a plurality of door latch assemblies 38 a continuous hinge 36 two polycarbonate panels 22 two clamp bars 34 and several hex headbolts, plain washers, lock washers 32. Referring to FIG. 11 is the door panel assembly once installed. Also shown are airholes, peepholes 23.

Figure 2:
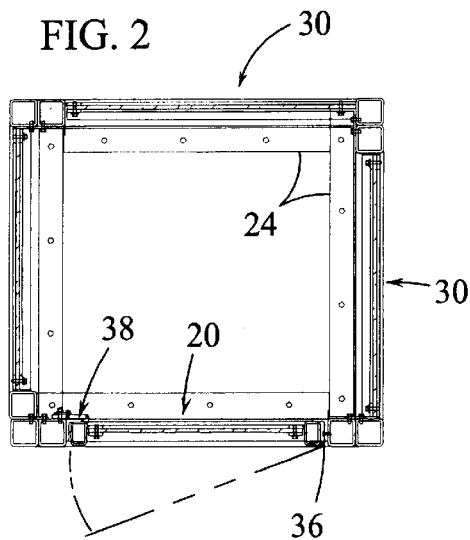
FIG. 2 is a top view of the Enclosure with the top panel removed
Figure 3:
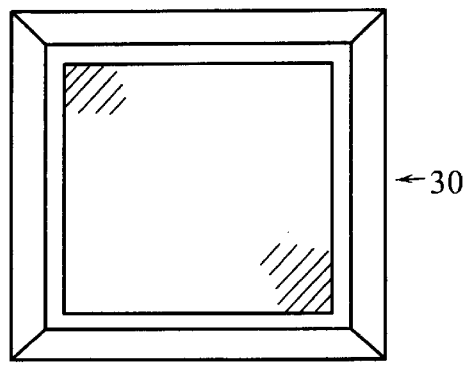
FIG. 3 is a top view of the Enclosure with the top panel installed.
Figure 4:
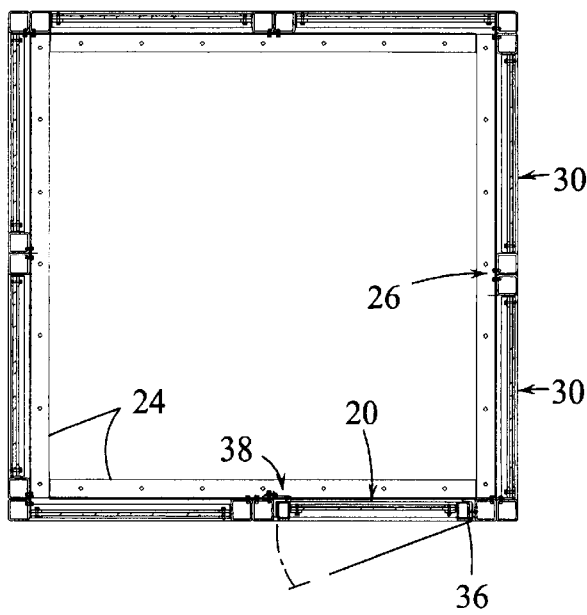
FIG. 4 is a top view of expanded Enclosure with the top panel removed.
Figure 5:
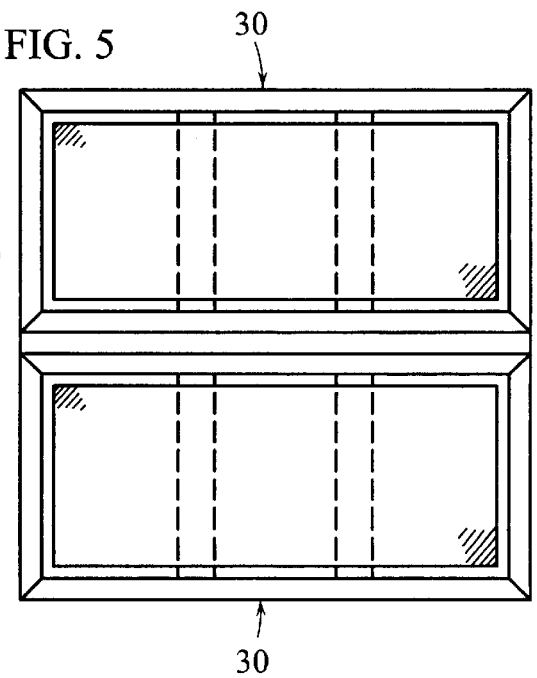
FIG. 5 is a top view of expanded Enclosure with the top panel installed.

Referring now to FIGS. 2, 3, 4 and 5; FIG. 2 is the top view of the Enclosure with the top typical panel assembly 30 removed showing the typical panel assembly 30 on all four sides of the Enclosure the continuous hinge 36 at the typical door panel assembly 20 and the door latch assembly 38 to secure the door at a closed position. Floor anchor angles 24 are shown in FIG. 2 and FIG. 4. FIG. 3 shows a top view of the Enclosure with the top typical panel assembly 30 installed. FIG. 4 is a top view of the expanded Enclosure with the top typical panel assembly 30 removed. The expanded Enclosure is a larger size of the same Enclosure shown in FIG. 1. Vertical splice plates 26 are located at the midpoint of each of the typical panel assemblies 30 which connect the panels together for the expanded Enclosure. FIG. 5 shows a top view of the expanded Enclosure with the top typical panel assemblies 30 installed.

Figure 6:
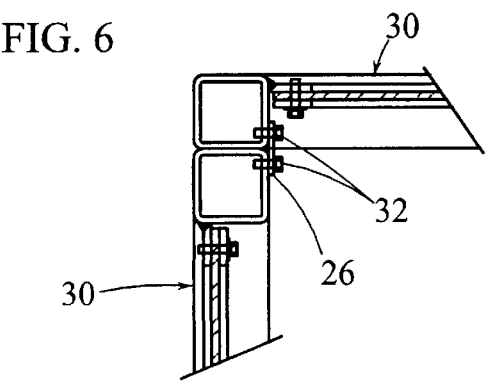
FIG. 6 is a partial sectional view showing top panel installation to side panel.

FIG. 6 is a partial sectional view showing the top typical panel assembly 30 installation to the side typical panel assembly 30 showing the vertical splice plate 26 at the corner and several hex headbolts, plain washers and lockwashers 32.

Figure 7:
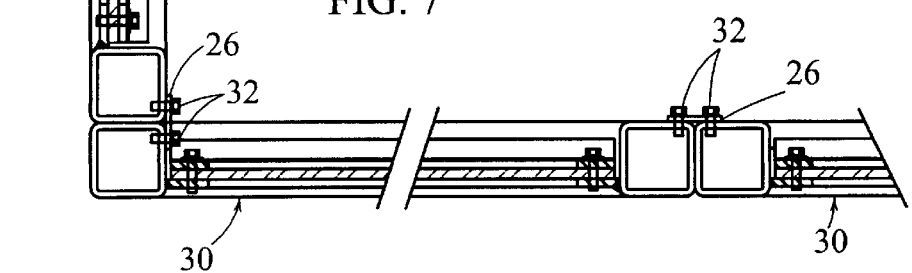
FIG. 7 is a partial sectional view showing panel corner splice and butt splice.

FIG. 7 is a partial sectional view showing panel corner splice and butt splice consisting again of vertical splice plates 26 and hex headbolts, plain washers, lockwashers 32 at the corner where typical panel assemblies 30 meet and midway through the expanded Enclosure side panel.

Figure 8:
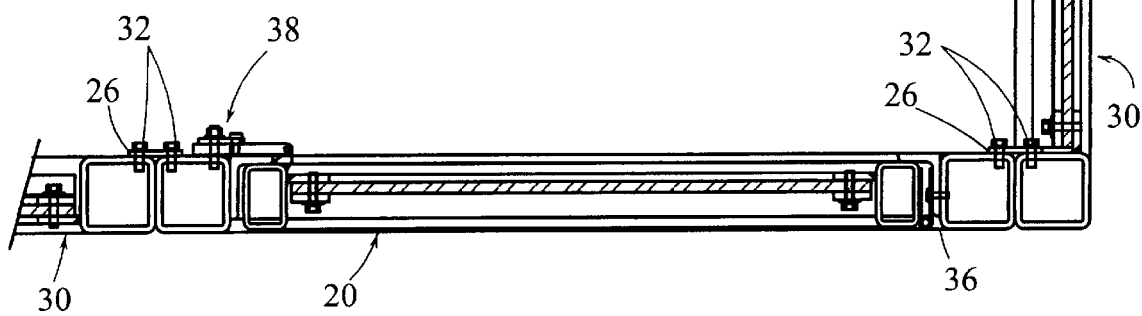
FIG. 8 is a partial sectional view of door panel installation.

FIG. 8 shows a partial sectional view of a typical door panel assembly 20 installation showing the continuous hinge 36 the typical door panel assembly 20 the door latch assembly 38 the vertical splice plates 26 the hex headbolts, plain washers and lockwashers 32.

Figure 9:
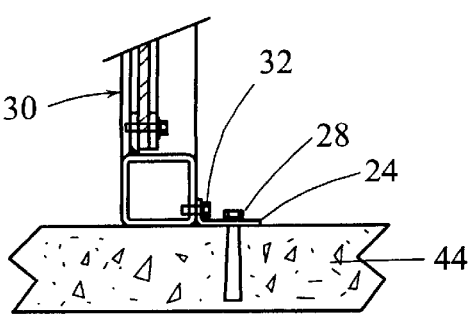
FIG. 9 is a partial sectional view of anchoring means to a concrete sub floor.

FIG. 9 shows a partial sectional view of the anchoring means to a concrete subfloor showing the concrete subfloor 44 into which is engaged the floor anchor angle 24 and the anchor bolts 28 securing the hex headbolts, plain washers and lockwashers 32 to the base of a typical panel assembly 30.

Figure 14A:
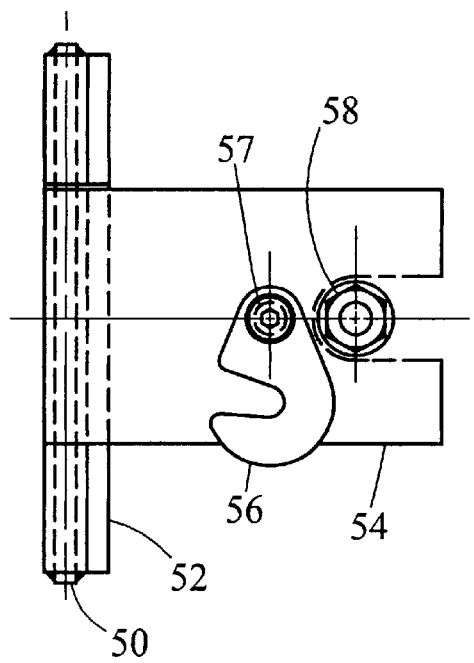
FIG. 14a is a side view of a door latch assembly in unlatched position.

FIG. 14a shows a side view of a door latch assembly in the unlatched position showing latch lock pivot pin 50, latch lock pivot 52 on latch lock plate 54 having shoulder bolt 57 and swing C washer 56 to engage within large stud with flange nut 58.

Figure 14B:
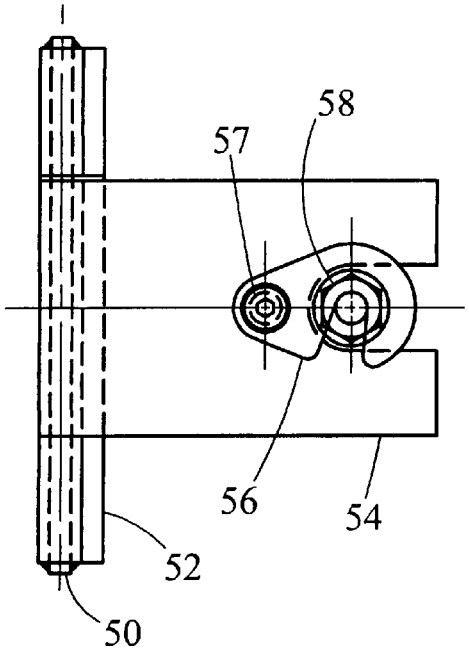
FIG. 14b is a side view of a door latch assembly in latched position.

FIG. 14b is a side view of a door latch assembly in latched position showing latch lock pivot pin 50 latch lock pivot 52 on latch lock plate 54 shoulder bolt 57 connecting swing C washer 56 engaged around large stud with flange nut 58.

Figure 15:
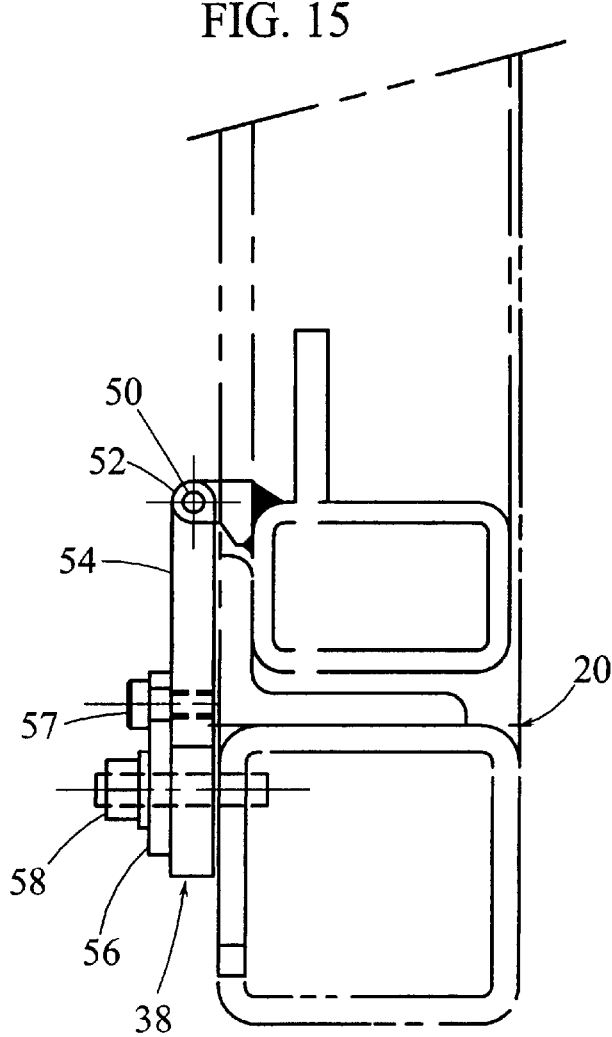
FIG. 15 is a partial sectional view showing door closed and in latched position.

FIG. 15 is a partial sectional view showing the typical door panel assembly 20 closed and the door latch assembly 38 in a latched position and showing the components of the door latch; the latch lock pivot pin 50 the latch pivot 52 the latch lock plate 54 the shoulder bolt 57 the large stud with flange nut 58 and the swing C washer 56 engaged around the large stud with flange nut 58.

Figure 16:
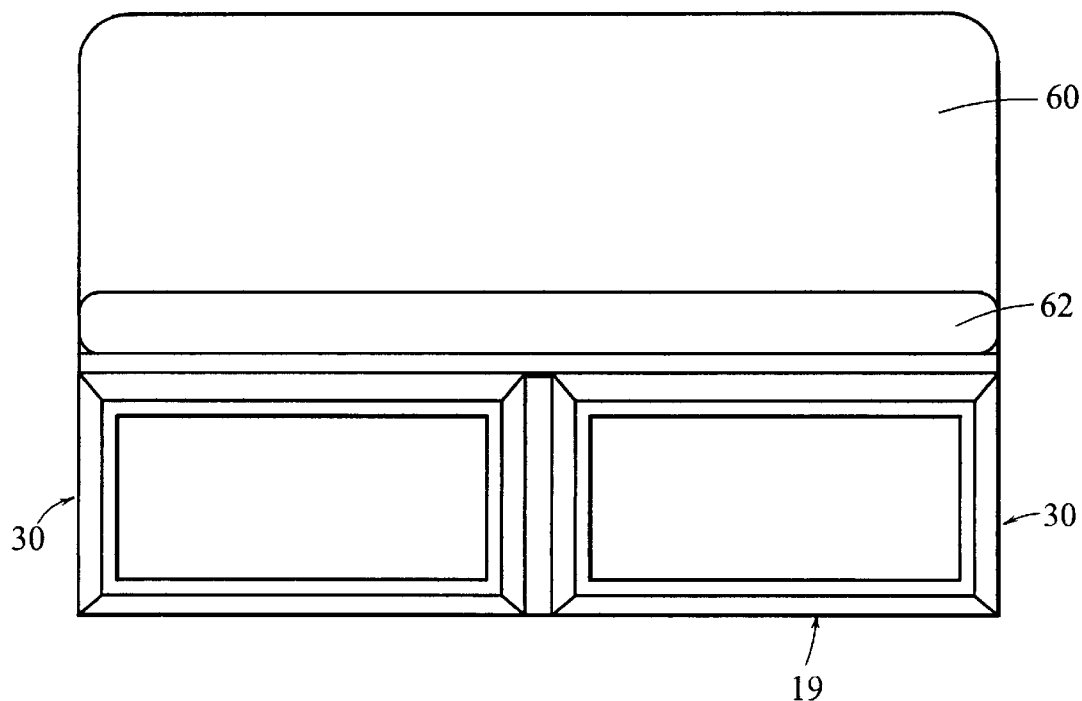
FIG. 16 is a front view of the Tornado Protective Enclosure used as a base for a bed.

FIG. 16 shows the Enclosure 19 having typical panel assemblies 30 installed at the base of a bed showing the mattress 62 and the headboard 60.

Figure 17:
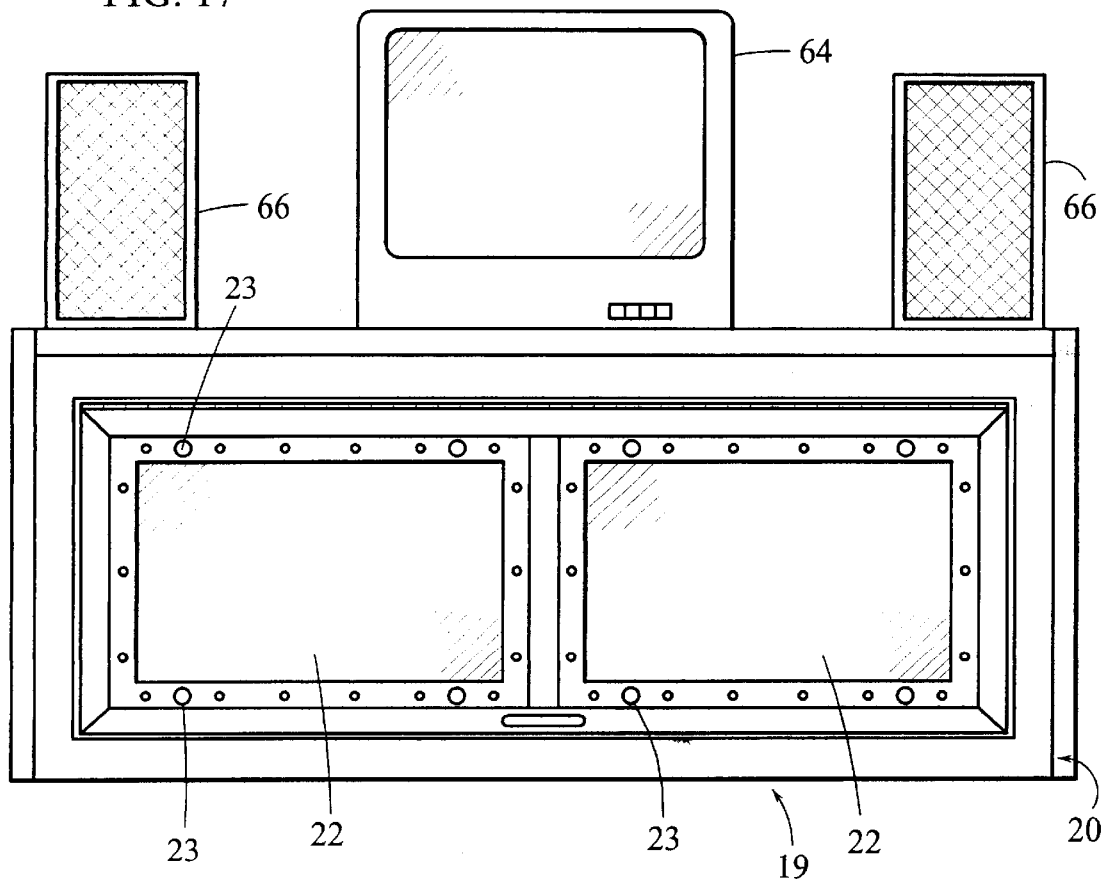
FIG. 17 is a front view of the Tornado Protective Enclosure used as a table.

Referring to FIG. 17, shown is the Enclosure 19 the typical door panel assembly 20 the airholes and peepholes 23 and the polycarbonate panels 22 used as the base of a table which may be used to locate a television 64 and speakers 66.

Figure 18A:
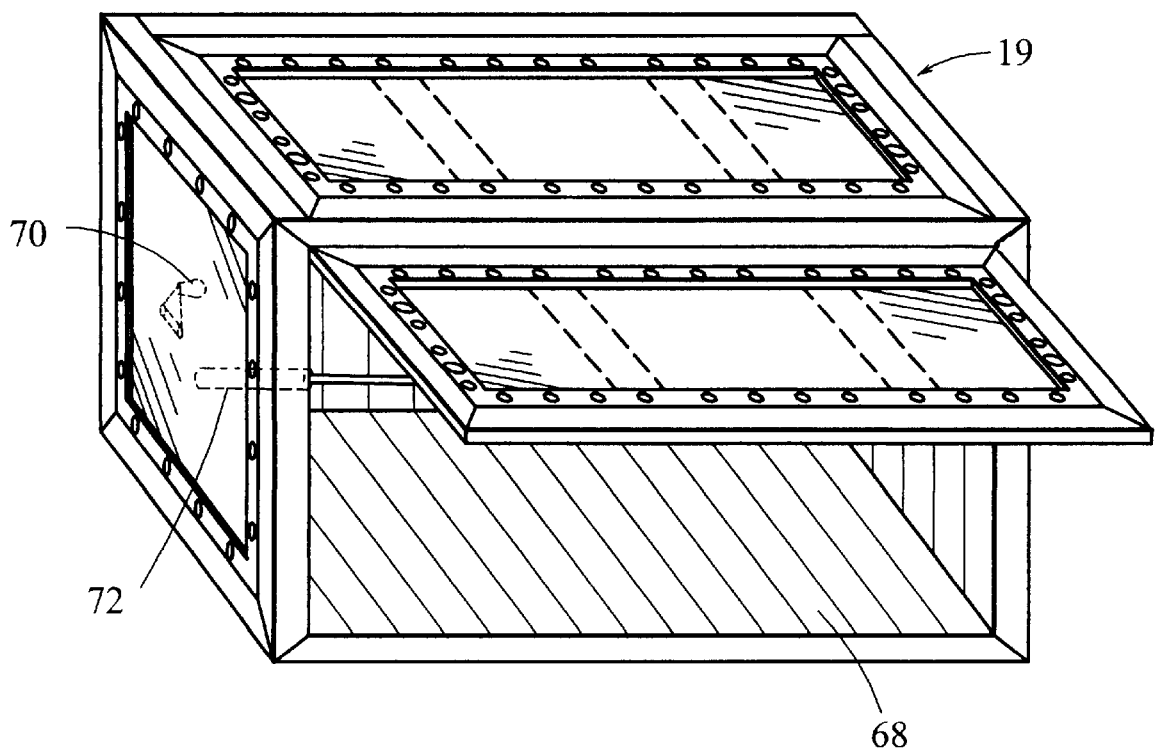
FIG. 18a is a perspective view of the Tornado Protective Enclosure showing padding, gas filled lift assists and strobe light.

FIG. 18a shows a prospective view of the Enclosure 19 having padding 68 on the inner surface and a gas filled lift apparatus 72 which raises the door and a battery operated strobe light 70.

Figure 18B:
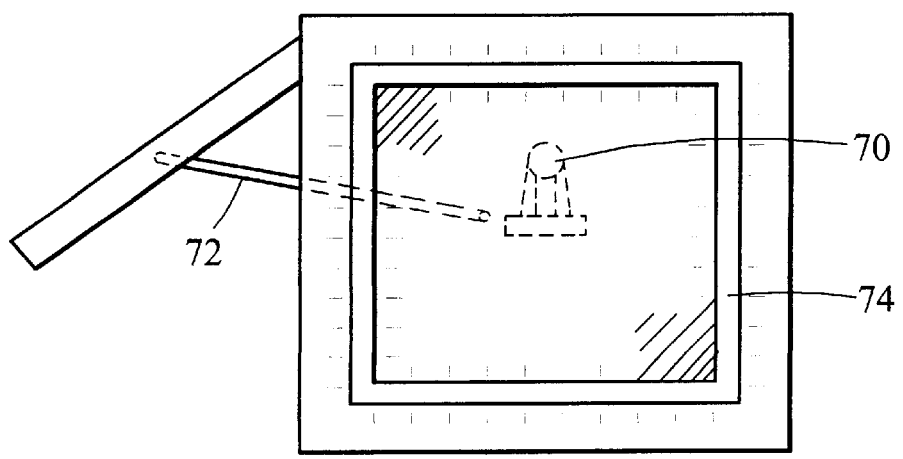
FIG 18b is a side view showing gas filled lift assists battery operated strobe light and reflective tape.

FIG. 18b is a side view showing gas filled lift assists 72 batter operated strobe light 70 and reflective tape 74.

While the present invention has been described in detail in relation to a preferred embodiment, it will be readily appreciated to those skilled in the art that modifications and variations in addition to those mentioned above may be made without departing from the scope and spirit of the invention. Such modifications are to be considered as included in the following claims.

Information Disclosure Statement

The following patents are known to the Inventor and are disclosed:
1. Larsen U.S. Pat. No. 5,662,132
2. Nakata U.S. Pat. No. 5,615,424
3. You U.S. Pat. No. 5,575,024
4. Epshetsky et al. U.S. Pat. No. 5,111,543
5. Tuchman U.S. Pat. No. 4,782,541
6. Wicker, Jr. U.S. Pat. No. 4,490,864
7. Silen U.S. Pat. No. 4,126,972
8. Qualline et al. U.S. Pat. No. 4,955,166
9. Thornton U.S. Pat. No. 9,615,158
10. Minks, Jr. U.S. Pat. No. 5,481,837

Larsen describes a protective structure that is a partial enclosure, similar in shape to a batting cage. The structure is used around and above beds, office chairs, or anywhere else a person may be sitting, standing or reclining.

Nakata describes an earthquake proof bed, A bed is surrounded by a strong, house-like enclosure having a solid ceiling and sides with openings. Tool boxes are formed in the base of the bed to hold necessities in the event of an emergency.

You describes a bed having a lid-like headboard portion and a box-like portion under the mattress. Upon the motion of an earthquake, the mattress automatically lowers down into the box-like portion and the lid-like portion automatically collapses to cover the mattress, providing an enclosure for a person or people lying on the mattress.

Epshetsky et al. describes a bed with a foldable earthquake protective cover. The cover is basically a high-strength canopy or shell above the bed that shields a person from falling objects.

Tuchman describes an earthquake protective bed that includes a canopy to protect individuals from falling objects. The bed also includes a padded rail around the bed to prevent individuals from being thrown out of the bed during an earthquake.

Wicker describes a type of a shelter in the form of a bed anchored to a floor. The bed has a drawer-like compartment beneath the mattress that a person would climb into during a tornado or hurricane.

Silen describes a tornado shelter that is a permanent fixture of a home. Basically, one room of the home serves as a shelter, by being adapted with reinforces walls and including a concrete slab that serves as part of the room's foundation.

Qualline et al. describes a large underground shelter anchored to the earth. The shelter is inserted into an excavated hole in the ground, and includes steps built into the structure to provide access into the shelter from ground level.

Thornton describes a large underground shelter positioned within a concrete foundation and anchored to the ground. A retractable ladder extends into the shelter to provide access into the shelter.

Minks describes a large, heavy shelter having thick concrete walls. The shelter is at least partially underground.

The above-mentioned references basically include either underground shelters and sheltering structures built into beds. The underground shelters are all large, permanent fixtures. The structures built into beds are either integral parts of the beds or are in the form of shields which cover the beds.

None of the above-mentioned references is lightweight and portable. None addresses the need for such a shelter that can be anchored within a building or outdoors and can be easily moved from one location to the other. None is a stand-alone enclosure which, in and of itself, protects the occupants from injury during a storm, and which can be easily utilized within a limited living space by the user(s) for other purposes.

I claim:

1. A temporary, lightweight, and portable shelter that provides a complete enclosure for one or more human occupants comprising:

a housing having six sides, an inner surface and an outer surface;

said sides consisting of panels which may be removed independently from each other from the inside or the outside of the housing;

said housing fabricated of polycarbonate themoplastic and steel sufficiently strong to withstand penetration from flying or falling debris during a tornado or hurricane;

an entry/exit means that may be opened and closed from both outside the housing and inside the housing, through which a person may enter and exit the housing and which secures in a closed position from inside the housing to provide a complete enclosure; and ventilation means in the housing.

2. The shelter as in claim 1 wherein the exterior dimensions do not exceed seven feet wide by seven feet long by seven feet high.

3. The shelter as in claim 1 wherein the inner surface is padded.

4. The shelter as in claim 1 further including peephole means through which an occupant peers out of the shelter and through which light enters the shelter when said entry/exit means is closed.

5. The shelter as in claim 1 further including anchors in said outer surface whereby the anchors may fix the shelter securely in place.

6. The shelter as in claim 1 further including a handle mounted on the outer surface whereby the handle on the outer surface is used to open said entry/exit means from the outside.

7. The shelter as in claim 1 further including a plurality of door latch assemblies mounted on the inner surface to secure the entry/exit means.

8. The shelter as in claim 1 further including reflective tape on the outer surface and a lighting fixture mounted on the outer or inner surface to be used to locate the shelter following a severe weather condition.

9. The shelter as in claim 1 further including a gas filled lift assist to lift said entry/exit means when shelter is mounted horizontally.

* * * * *